(12) United States Patent
Ogata

(10) Patent No.: US 6,256,078 B1
(45) Date of Patent: Jul. 3, 2001

(54) STOWING APPARATUS OF PICTURE MONITOR FOR TRANSPORTATION

(75) Inventor: Toshiro Ogata, Ota-ku (JP)

(73) Assignee: Minebea Co., Ltd., Nagoya-ken (JP)

( * ) Notice: Subject to any disclaimer, the term of this patent is extended or adjusted under 35 U.S.C. 154(b) by 0 days.

(21) Appl. No.: 09/343,530

(22) Filed: Jun. 30, 1999

(30) Foreign Application Priority Data

Nov. 24, 1998 (JP) ................................. 10-349352

(51) Int. Cl.⁷ .................................. G02F 1/1333
(52) U.S. Cl. ............................ 349/58; 249/917
(58) Field of Search ........................ 248/917, 918, 248/919, 920, 921, 922, 923, 924; 349/58

(56) References Cited

U.S. PATENT DOCUMENTS 5,096,271 * 3/1992 Portman ........................ 312/7.2
6,157,418 * 12/2000 Rosen .......................... 348/837

FOREIGN PATENT DOCUMENTS 5-97098  4/1993 (JP) .

* cited by examiner

Primary Examiner—James A. Dudek
(74) Attorney, Agent, or Firm—Oliff & Berridge, PLC

(57) ABSTRACT

The frame 9 is mounted on the ceiling 3 of the transportation, on which the liquid crystal panel 7 is stowed in such a manner as the surface of the liquid crystal faces to the ceiling, and when the liquid crystal panel positions for displaying, it is turned by approximately 120 degrees by the drive mechanism 19, so that the passenger sitting at the seat can easily watch it. The driving of the liquid crystal panel from the stowing position to the displaying position is carried out by the motor, the displacing from the displaying position to the stowing position is carried out by the spring. When the liquid crystal panel receives a shock by the collision of a head of passenger during displaying, the detecting device may detect the deviation of the liquid crystal panel and transmit the signal to the control circuit 44. The control circuit 44 returns the liquid crystal panel 7 to the stowing position by releasing the electromagnetic brake.

8 Claims, 5 Drawing Sheets

STOWING APPARATUS OF PICTURE MONITOR FOR TRANSPORTATION

BACKGROUND OF THE INVENTION

1. Field of the Invention

The present invention relates to a stowing apparatus of a picture monitor for transportation such as an airplane, a train and a sightseeing bus.

2. Related Art

In a passenger airplane of a airplane, picture monitors (hereinafter referred to "monitors")for explaining passengers about security apparatuses and displaying programmed movies are provided. And, passenger cars and sightseeing buses for party tourists are happened to be provided with similar monitors.

As these monitors, conventionally projectors or CRTs (cathode-ray tube, so called a TV tube) are often employed, but recently liquid crystal panels, which have been increased in definition, have been noticed. In case a liquid crystal panel is used as a monitor, since the size thereof is limited, every group of several passengers is adapted to watch one monitor, further, since the screen of the monitor is small, the monitor is mounted on the ceiling located above the passenger seat. In this case, since the ceiling of the passenger cabin is low, the monitor is adapted to be stowed in a shroud when getting on and off or at the time of emergency to prevent the monitor from being projected to the passenger.

What is requested for this kind of monitor in particular for airplane, when the cabin will lose electric power, the monitor is automatically stowed and is desirably avoided to collide with passengers. Regarding this point, the Federal Aviation Administration (FAA) requires to insure the passengers safety and for monitors to retract totally when electric power to the cabin turned off. It is because, since the monitors protrude downward from the ceiling, the head of the passenger is apt to hit them to cause the passenger to injure himself or damages the monitor.

And, since the appliances in such a passenger cabin will receive vibrations, shocks or acceleration from all directions due to the posture of the airplane or the air stream situation or when taking off, flying and landing, it is a matter of course to clear the safety standard provided by the FAA and on the other hand it is necessary to satisfy the functions to be requested even in the above provided conditions, for instance, in a normal vibration or shock during flight, it is desirable that the monitors in operation do not rotate toward stowing position and stop displaying. Therefore, when the electric power to the monitors is lost, it is necessary to stow the monitors automatically and in addition, desirably, the monitors have better to be stowed when any power more than predetermined value is added.

As a prior art in this field, there is what is disclosed in the Japanese patent laid-open No. Hei 5-97098. In this invention, the following technique is disclosed, that is, when keeping a monitor in operation position (display position), an electric brake is used, and when the passenger cabin loses electric power or the head of a passenger hits the monitor, the monitor will be stowed automatically. And in this invention, when rotating a monitor from the stowing position to the display position and from the display position to the stowing position, the driving power is obtained from an electric motor and the power holding the monitor in the display position is obtained from an electric brake.

In what is disclosed in the above laid-open publication, when the electric power in the passenger cabin is turned off and the monitor is hit with the head of any passenger, the restoring power of sliding clutches and coil spring makes the monitor turned to the stowing position. Therefore, the coil spring functions as a back up (auxiliary) mechanism to the electric motor. And, in this invention, when the monitors are turned from the display position to the stowing position due to the restoring power of the stored energy of the coil spring, the electric motor and the gears connected to the motor are made use of an inertia limiting device for reducing the turning speed of the monitors.

In order to watch the screen of a monitor by any passenger at a seat below the monitor mounted on the ceiling of a passenger airplane, the screen is necessary to face to the passenger. However, in the invention disclosed in the above publication, since a rotation angle of the monitor becomes less than 90° due to its structure, there is a high possibility that the surface of the monitor (front surface of a liquid crystal panel) has to face downward when stowing to cause it to be stained or damaged. On the other hand, when carrying out a maintenance thereof, the monitor is drawn out manually from the stowing position and kept in the displaying position, and the maintenance work is carried out. However, there is a problem in which, the maintenance work in the un-powered state of the monitor has to be carried out so as to keep the monitor not to retract into the stowing position, therefore the maintenance work has not been easy.

SUMMARY OF THE INVENTION

The present invention has been made in the light of the above problem and is to provide a stowing apparatus of the monitors for transportation, in which, at the time of maintenance work, it is easily carried out to hold the monitor with ease while keeping the monitors in the drawn out position.

In the present invention, in order to solve the above problems, according to a first aspect thereof, a stowing apparatus for a picture monitor for transportation comprises a frame engaging with a plate fixed on the ceiling of a transportation, a liquid crystal panel one end of which is mounted thereon by pivoting in such a manner, at a first position the surface of the liquid crystal faces to the ceiling and at a second position, the surface of the liquid crystal makes an open angle of 90 degrees or more to the first position by turning the liquid crystal panel at pivoting point, a driving mechanism which drives the liquid crystal panel to the first and second positions, a connecting mechanism interposed between the output portion of the driving mechanism and the liquid crystal panel, a shock detecting mechanism, which is provided on a part of the connecting mechanism, for detecting a shock given to the liquid crystal panel, a control circuit for operating the driving mechanism when the shock detecting mechanism detects some shock to stow the liquid crystal panel in the first position, a locking mechanism for locking the liquid crystal panel in the first position and a releasing mechanism for releasing the said locking due to the locking mechanism.

According to a second aspect of the present invention, in the first aspect, the said driving mechanism which displaces the liquid crystal panel between the first and second position is formed with a motor with speed reduction mechanism and a spring stored with a restoring force by being wound by the motor, wherein, when displacing the liquid crystal panel from the first position to the second position, the motor is in operation and when displacing the liquid crystal panel from the second position to the first position, the restoring force of the spring functions.

According to a third aspect of the present invention, in the first aspect, the said shock detecting mechanism provided on one portion of said connecting mechanism comprises two plates, one portion of which is pivoted with each other, a balance spring mounted between the two plates and an angle detecting sensor which is disposed nearby the two plates in order to detect a relative angle of the said two plates.

According to a fourth aspect of the present invention, in the first aspect, the said locking mechanism uses a negative operation type, which is operative in non-current state, of electromagnetic brake as a lock mechanism to keep the liquid crystal panel in the first position.

According to a fifth aspect of the present invention, in the first aspect, an operation which causes the liquid crystal panel to be restored from the second position to the first position by detecting the shock in the said shock detecting mechanism is to be repeated by the predetermined times and when exceeding the times, such operation is restricted.

According to a sixth aspect of the present invention, in the first aspect, in the speed reduction mechanism connected to the motor of the driving mechanism, a mechanism which lessens a resistance in a direction toward which the liquid crystal panel is driven and increases a resistance in the direction toward which the liquid crystal panel is not driven is installed.

According to a seventh aspect of the present invention, in the second aspect, the said spring mechanism is formed with two coil springs wound a shaft, each end of which is connected to the frame and the other end of the coil springs is connected to the liquid crystal panel.

Further, according to the eighth aspect of the present invention, in the fourth aspect of the present invention, a rotary shaft to release the operation of the said negative operation type of electromagnetic brake is provided.

According to the present invention thus constructed, when turning the liquid crystal panel of the monitor from the stowing position to the operation position, the output of the motor is used. To the contrary, when turning it from the operation position to the stowing position, the restoring force stored in the wound springs is adapted to be used. At the time of stowing the monitor, the liquid crystal panel faces to the ceiling, and at the time of the maintenance, it is able to turn the stowed liquid crystal panel manually to the operation position. When a head of a passenger collides with the liquid crystal panel in operation, the shock detecting mechanism can detect it and send a signal to the control circuit, so that the liquid crystal panel will be automatically stowed.

EMBODIMENT

Figure 1:
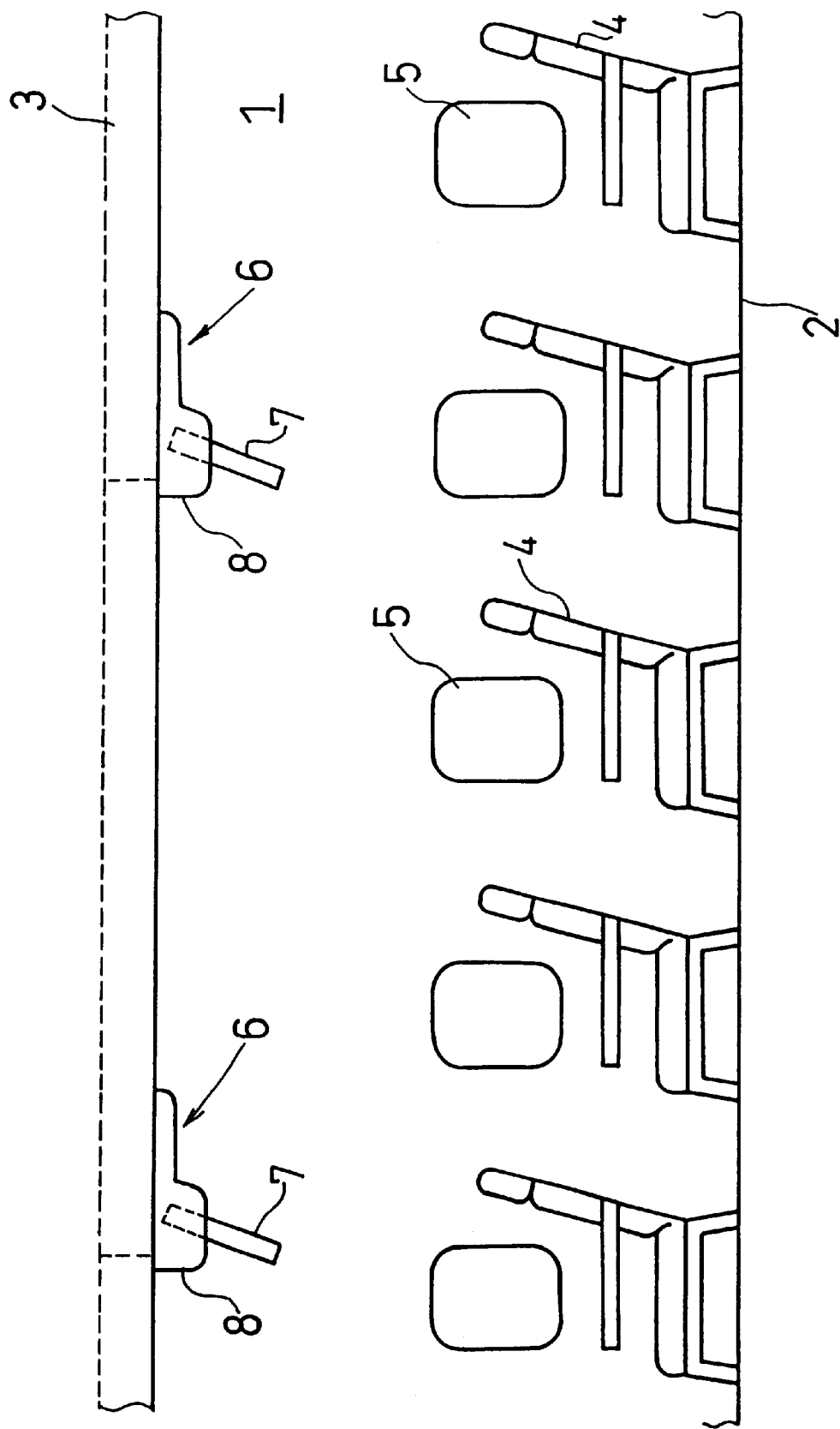
FIG. 1 is a side view showing the state where the monitor as an embodiment of the present invention is mounted on the ceiling of a passenger airplane.

Hereinafter, an embodiment of the present invention is explained based on the attached drawings. FIG. 1 shows a passenger cabin 1 of a passenger airplane. This passenger cabin is defined with a floor 2 and a ceiling 3. On the floor 2, sheets 4 are mounted at a regular spacing and passengers sit thereon. 5 designates windows. On the ceiling 3, monitors 6 are mounted. The monitors 6 comprises a liquid crystal panel 7 and a shroud 8 in which the liquid crystal panel 7 is stowed.

Figure 2:
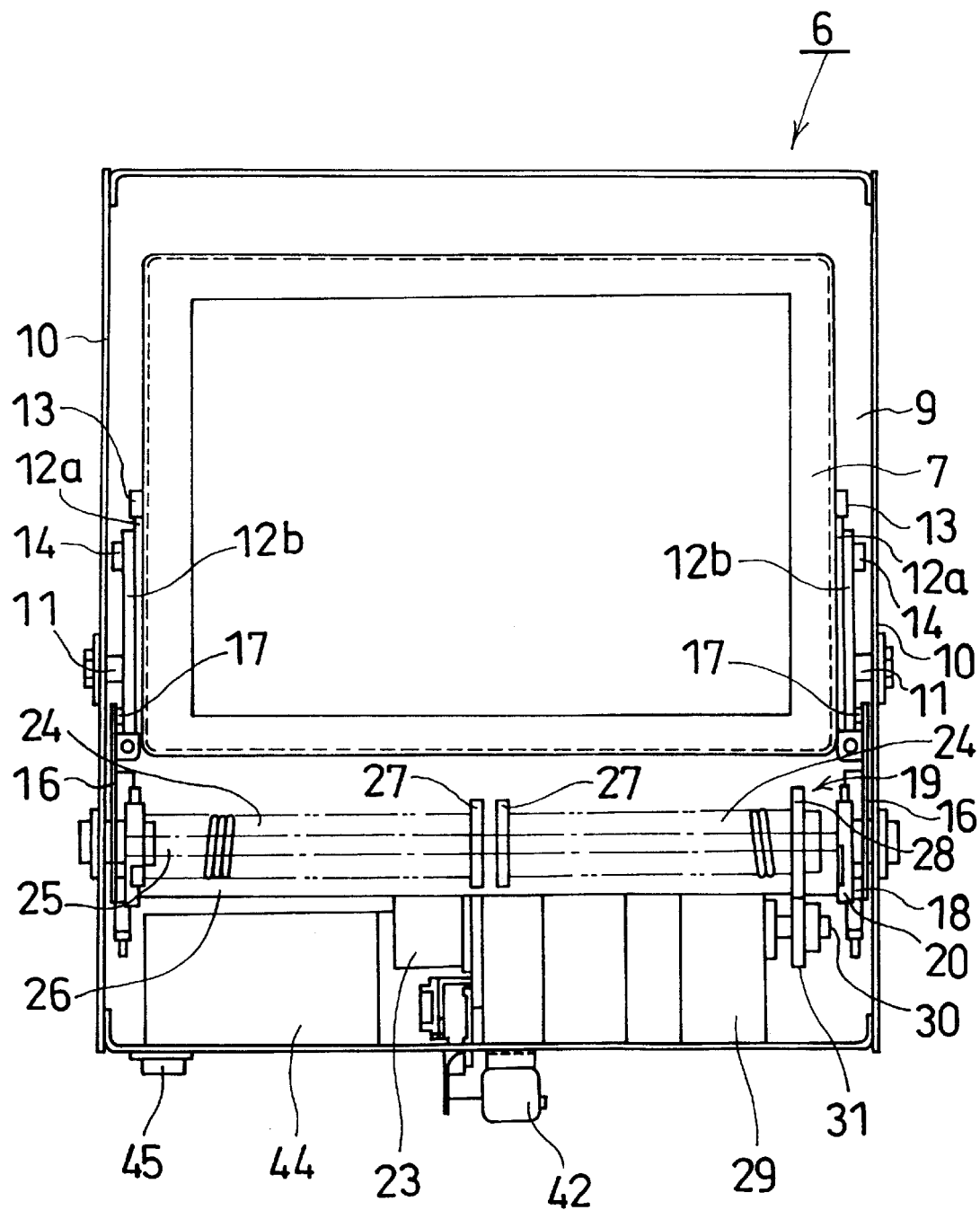
FIG. 2 is a bottom view of the monitor shown in FIG. 1, where the shroud of which is uncovered.
Figure 3:
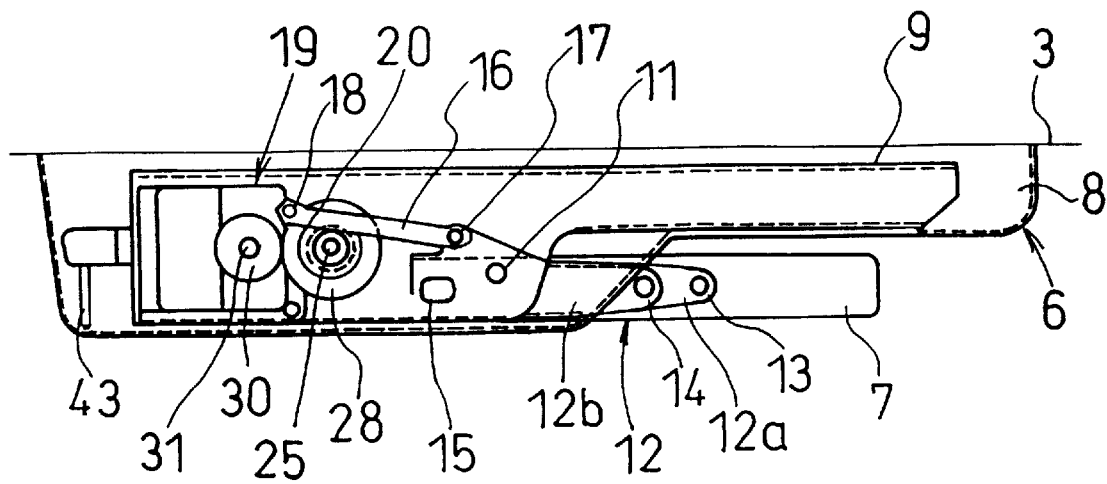
FIG. 3 is a side view of the driving mechanism shown in FIG. 2, which is seen from right side of FIG. 2.
Figure 4:
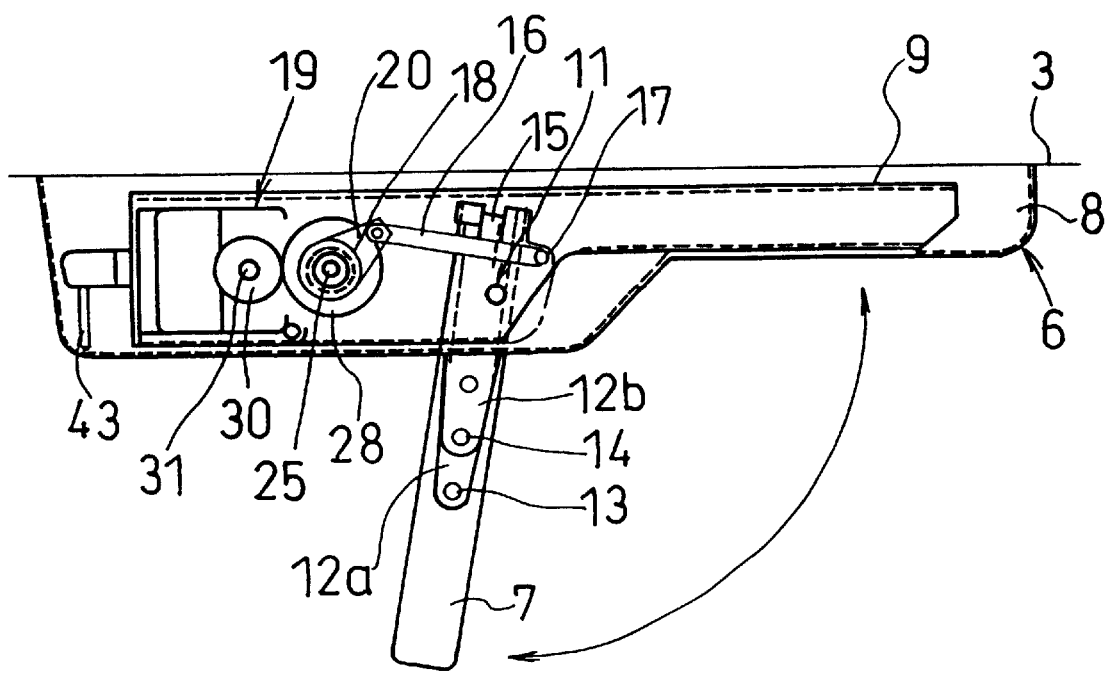
FIG. 4 is a side view of the liquid crystal panel shown in FIG. 3, which is turned to the operation position.

FIG. 2 shows a state where the shroud 8 of the monitor 6 of FIG. 1 is uncovered from the monitor 6. Reference 9 designates a frame 9 which is mounted on the mounting plate (not shown) fixed to the ceiling 3 of the passenger cabin 1. On each side of the frame 9, side wall 10 stands respectively, on each of which a first shaft 11 is provided symmetrically. And, on this pair of shafts 11, an arm plate 12b is rotatably mounted. On the other hand, one end of each arm plate 12a is fixed on each of both sides of the liquid crystal panel 7 with a screw 13, and a second shaft 14 which is located at the center of weight of the liquid crystal panel 7. On this second shaft 14 one end of the above mentioned arm plate 12b is mounted rotatably. Now, the other end of the arm plate 12b is overlapped on the other end of the arm plate 12a fixed on the side of the liquid crystal panel 7 and connected with two balance springs 15. As a result, the arm plate 12b is rotated merely on the shafts 11 and the arm plate 12a is rotated merely on the shafts 14 relatively with the arm plate 12b within a limitation of the balance spring 15 between the arm plates 12b. This balance spring 15 makes two arm plates 12a and 12b keep in balance in the neutral position mutually, when, in particular, the liquid crystal panel 7 does not receive any outer force such as by a collision of passenger's head. Accordingly, when receiving any outer force, the balance springs 15 is adapted to absorb its shock in the mutual relation of elongation and compression of both springs. This movement is detected by an angle sensor not shown. That is, these angle sensor, two arm plates 12a and 12b and two balance springs 15 constitute a shock detecting mechanism at the time when the liquid crystal panel receives a shock.

Now, one enlarged portion of the arm plate 12b around the shaft 11 is connected with an end of a link 16 with a shaft 17 and the other end thereof is connected to an output arm 20 of a driving mechanism 19. Accordingly, the rotation of the output arm 20 is transmitted to the arm 12b through the link 16 and turns the liquid crystal panel 7 between the first position where the liquid crystal panel 7 is stowed and the second position where the liquid crystal panel 7 is in operation. As mentioned above, when the liquid crystal does not receive any outer force, two arm plates 12a and 12b are turned in a unitary manner.

Figure 5:
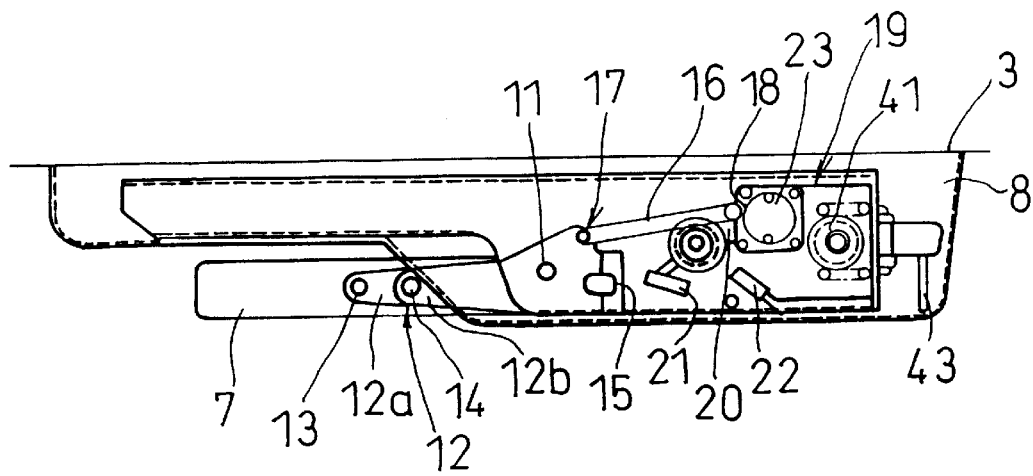
FIG. 5 is a side view of the driving mechanism shown in FIG. 2, which is seen from left side of FIG. 2.
Figure 6:
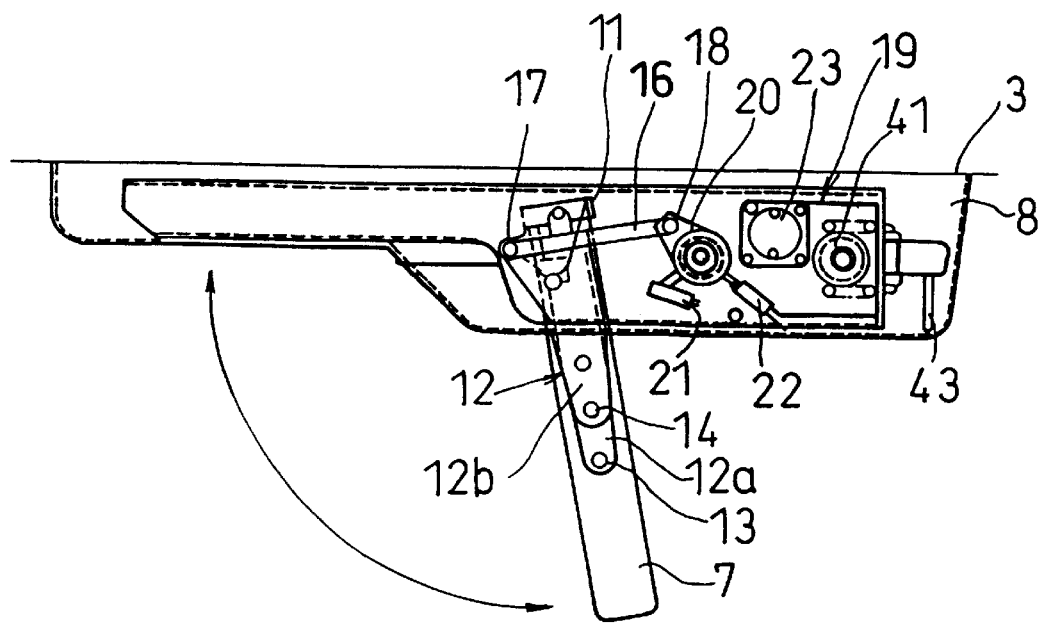
FIG. 6 is a side view of the liquid crystal panel shown in FIG. 5, which is turned to the operation position.

As shown in FIGS. 5 and 6, nearby the output arm 20, two switches 21, 22 are provided, by detecting the approaching of a detecting plate formed with the output arm 20 in a unit, the turning status of the output arm 20 is detected, and if the rotation angle exceeds a predetermined angle, its detected signal is transmitted to a controller (circuit) later mentioned to regulate the rotation angle of the output arm.

Next, the driving mechanism 19 is explained. The driving mechanism is constituted with a motor 23 and springs 24 which is wound by the motor 23 and stored with the restoring force, and when displacing the liquid crystal panel 7 from the first position in which it is stowed to the second position in which it is in operation, the motor 23 does the work, and when it is turned to the first position, the restoring force of the springs 24 does the work. As shown in FIG. 2, the spring 24 comprises two in number, which are wound around a drive shaft 25, one end thereof is fixed on a shaft 26 bridged on the pair of side walls provided on the frame 9 and the other end thereof is engaged with a flange 27 mounted on the shaft 25.

On both ends of the drive shaft 25, the output arm 20 aforementioned is mounted. Further, one portion of the drive shaft 25 is provided with a gear 28 which engages with a gear 31 mounted on an output shaft 30 of a rotary actuator 29. Thereby, when the rotary actuator functions, a rotation force generated on the output shaft 30 is adapted to rotate the drive shaft 25. By selecting the winding direction of the two springs 24, two springs are adapted to be wound simultaneously when the rotary actuator is in operation, and further when the rotary actuator 29 is in operation, the liquid crystal panel is adapted to be turned from the first position for stowing to the second position for displaying, and the force to return the liquid crystal panel from the second position for displaying to the first position for stowing is adapted to be obtained from the rewinding force of two springs 24.

Figure 7:
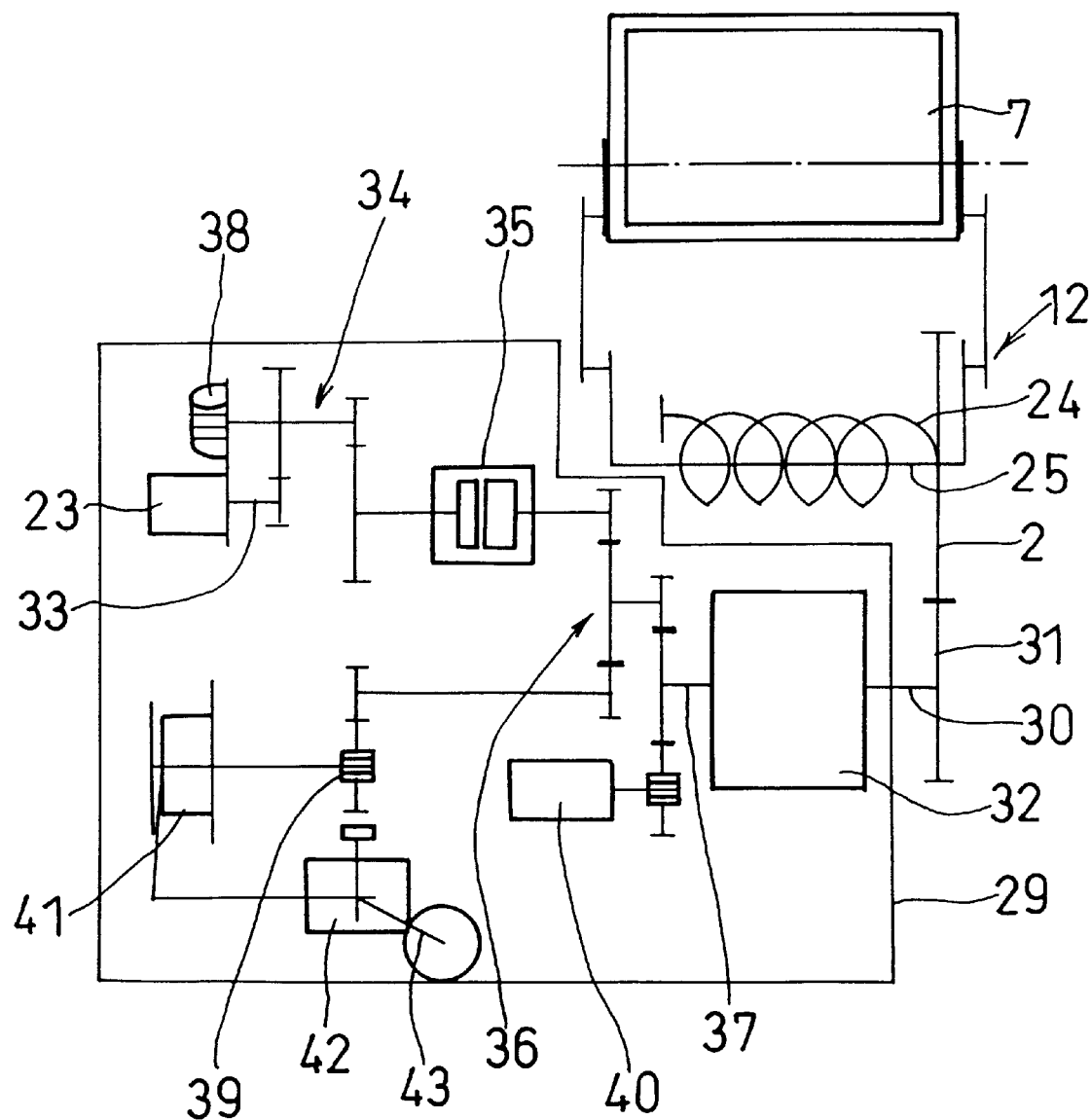
FIG. 7 is a schematic diagram showing the inner structure of the rotary actuator of the driving mechanism.

Next, mainly from FIG. 7 the rotary actuator 29 is explained. The output shaft 30 of the rotary actuator 29 comes out from a reduction gears 32. Now, in other Figs. too, same parts to FIG. 7 bear the same signs.

The rotary actuator 29 is provided with a motor 23, the output shaft 33 of which is connected to the input side of an electromagnetic clutch 35 through a group of gears 34, an output side of which is connected to an input shaft 37 of the reduction gears 32 through a group of gears 36. In groups of gears 34, 36, one direction roller bearings 38, 39 are connected, when the liquid crystal panel 7 is in the second position, it is prevented from being returned to the first position due to the stored energy.

To the group of gears 36 an inertia limiting apparatus 40 is connected, when the liquid crystal panel 7 is turned to the first position for stowing by making use of the stored energy of the springs 24, the rotation speed transmitted to the rotary actuator 29 through the gear 28 and 31 is adapted to be damped merely in one way. Thereby, the shock at the time of collision of the head of passengers is damped to some extent.

To the one direction roller bearing 39, as a lock mechanism, a negatively operational (when an electric power is supplied, the brake is released) and electro-magnetic brake 41 is connected, which functions when an electric power is not supplied, when the liquid crystal panel is either in the stowing position or in the displaying position, it is adapted to be prevented from being moved unintentionally. With this electro-magnetic brake 41 a manual rotation shaft 43 of a mechanism 42 for releasing the limitation is provided. This rotation shaft 43 is, as shown in FIGS. 3–6, provided in the shroud 8 facing downward. Therefore, a tiny opening of the shroud 8 allows a tool to be inserted through that opening and to operate for limiting and releasing operation to the electro-magnetic brake 41 by rotating the rotation shaft 43.

A sign 44 shown in FIG. 2 is a control circuit and 45 is a connector. The connector 45 is connected with a cable not shown to a control device of an airplane and receives a signal from the control device and transmit it to the control circuit 44. The control circuit 44 receives the signal and drives the liquid crystal panel 7.

In thus constructed stowing apparatus of picture monitor for transportation, the liquid crystal panel 7 faces to the ceiling 3 in the first position for stowing. In that state, and when a command signal from a crew side to operate the monitor 6 for passenger service is sent, by a CPU installed in the control circuit 44, the switch 21 and 22 detected that the liquid crystal panel is stowed in the first position and the electromagnetic clutch 35 is operated, and the motor 23 and the reduction gears 32 are connected. At the same time, the electromagnetic brake 41 which is provided on the input shaft 37 of the reduction gears 32 functions as preventing the rotation of the input shaft 37 by suppling an electric power to release its limiting. Thereby, the liquid crystal panel 7 will turn from the first position for stowing and to the second position for displaying.

When the liquid crystal panel 7 is turned at predetermined angle (90 degrees or more from the stowing position, for instance 120 degrees) and positioned at an appropriate position from a passenger sitting on the seat 4 shown in FIG. 1, that position is detected by the switch 21, 22. Thereby, the electric power to the motor 23 stops to limit a further turning of the panel 7. Although, by the operation of the motor 23, the springs 24 are wound and when the motor stops, the rewinding force will act as turning the liquid crystal panel 7 to the stowing position, the one direction roller bearings 38, 39 will prevent the force to keep the liquid crystal panel 7 in the second position.

Services in the passengers cabin are finished, and when a command signal for returning the liquid crystal panel 7 to the first position is transmitted, the control circuit 44 receiving that command stops the supply of the electric power to the electro-magnetic clutch 35 due to the CPU installed in the control circuit 44. Thereby, the springs 24 wound around the drive shaft 25 stored with the restoring energy rotates the drive shaft 25 to turn the arm plate 12b connected to the end of the link 16 with a the shaft 17 and stow the liquid crystal panel 7 in the first position.

Then, the supply of the electric power to electro-magnetic brake 41 as well as the electro-magnetic clutch 35 is stopped and functions so as to limit the rotation of the group of gears 36, which, however, is adapted to be suspended by the one way roller bearing 39 mounted on the shaft of the electro-magnetic brake 41. Thereby, the liquid crystal panel 7 rotates from the second position in operation to the first position for stowing. When the liquid crystal panel 7 is in the first position for stowing, the electric power does not supply to the electro-magnetic clutch 35, the electro-magnetic brake 41 and the motor 23. At this state, when a force is applied to the liquid crystal panel 7 from outside of the monitor toward the second position of the panel, such force is transmitted to the rotary actuator 29 through the arm plate 12b, the drive shaft 25, the gear 28 and 31, it does not rotate because the electromagnetic brake 41 which functions when the electric power is not supplied limits the input shaft 37 of the reduction gears 32. Thereby, at the time of stowing the liquid crystal panel 7, even if an outer force such as a vibration or a shock, etc. is applied, the liquid crystal panel 7 is prevented from being turned unintentionally.

When the liquid crystal panel 7 is in the second position, if the head of a passenger happens to hit it, the liquid crystal panel may receive a rotary torque around the second shaft 14. Then, one of two balance springs 15 is elongated and the other one is compressed, so that two arm plates 12a and 12b are deviated. This deviation is detected by the angle sensor not shown and that signal is transmitted to the control circuit 44. Since the control circuit receiving that signal stops the electric power supply to the electromagnetic clutch 35 and the electromagnetic brake 41, the liquid crystal panel 7 rotates from the second position in operation to the first position for stowing due to the energy (restoring power) stored in the springs 24. The liquid crystal panel 7 is adapted to be rotated by a little angle to the arm plate 12b together with the arm plate 12a. And, since the liquid crystal panel 7 (arm plate 12a) is balanced resiliently against the arm plate 12b with two balance springs 15, it is similarly functioned even if a load from either sides i.e. from the front or the rear is applied.

The control circuit 44 is provided with a function to detect how many times the automatic stowing operation are consecutively repeated. Therefore, when operating a predetermined times, for example three times, the liquid crystal panel 7 is automatically stowed. When re-starting after checking, re-setting button not shown is pressed. In this case an alarm device can be provided with the control circuit 44. When turning the liquid crystal panel 7 manually from the first position to the second position for maintenance and the like, a small screw driver may be inserted through a tiny hole (not shown) of the shroud 8 to release the electro-magnetic brake 41.

Although the above embodiment of the present invention is to provide a monitor to be mounted in a passenger cabin of an airplane, the present invention is not to be limited to this embodiment. This can be applied to a train or a sightseeing bus. And, in a case where a plurality of monitors are mounted in a room, these can be driven simultaneously and individually.

Thus, according to the present invention, the liquid crystal panel as a monitor of transportations can be automatically turned between the first position for stowing and the second position for displaying. And, since the turning from the second position for displaying to the first position for stowing is carried out by the restoring force of the spring, it is secured even if the electric power is off. Since the springs are provided two in number, the rotational force to be conveyed to the drive shaft is natural and smoothly operated. Since the liquid crystal panel faces to the ceiling when being stowed, there is no chance to be touched with some articles, and that will prevent the panel from being damaged. Further, even if, by chance, a head of passenger collides with the panel, it may be stowed automatically, so that the passenger does not injure himself. And in this case, if such occasion is continued, the liquid crystal panel may be automatically stowed, and stand by for an inspection. Since the liquid crystal panel can be turned 90 degrees or more, passengers can easily watch it. At the time of maintenance, since the panel is easily turned manually from the first position for stowing to the second position in operation, the maintenance efficiency is increased.

What is claimed is:

1. A stowing apparatus for picture monitor for transportation comprising a frame to be mounted on a mounting plate mounted on a ceiling of the transportation, a liquid crystal panel pivoted on the frame, a surface of which faces to the ceiling in a first position for stowing and opens over 90 degrees to the stowing position pivotally in a second position for displaying, a driving mechanism for turning the liquid crystal panel between the first position and the second position, a connection mechanism interposed between an output portion of the driving mechanism and the liquid crystal panel, a shock detecting device, which is provided on one portion of the connection mechanism, for detecting a shock when the liquid crystal panel receives a shock, a control circuit for stowing the liquid crystal panel in the first position by functioning the driving mechanism, a locking mechanism for locking the liquid crystal panel in the first position and a releasing mechanism for releasing the locking of the locking mechanism.

2. A stowing apparatus for picture monitor for transportation according to claim 1, said driving mechanism for displacing the liquid crystal panel between the first and second positions comprising a motor having a speed reduction mechanism and a spring mechanism stored with a restoring force by being wound by the motor, wherein, when the liquid crystal panel is displaced from the first position to the second position, the motor functions and when the liquid crystal panel is displaced from the second position to the first position, the force of restoring of the spring functions.

3. A stowing apparatus for picture monitor for transportation according to claim 1, a shock detecting mechanism provided on one portion of the connection mechanism comprises two arm plates connected by pivoting on each other, a balancing spring provided between the two arm plates and an angle detector disposed nearby the two arm plates and detect the mutual angle.

4. A stowing apparatus for picture monitor for transportation according to claim 1, wherein as a lock mechanism for locking the liquid crystal panel in the first position, a negatively operational electromagnetic brake is used.

5. A stowing apparatus for picture monitor for transportation according to claim 1, wherein said operation of returning the liquid crystal panel to the first position when detecting a shock by the detecting device is repeated by the predetermined times, then the operation is limited.

6. A stowing apparatus for picture monitor for transportation according to claim 1, wherein said speed reduction mechanism connected to the motor in the driving mechanism includes a mechanism which functions weak in resistance in the direction toward which the liquid crystal panel is driven by the motor and great in resistance in the direction toward which the liquid crystal panel is not driven.

7. A stowing apparatus for picture monitor for transportation according to claim 2, wherein said spring mechanism is formed with two coil springs wound a shaft, one end of each coil spring is connected to the frame side and the other end is connected to the liquid crystal panel side.

8. A stowing apparatus for picture monitor for transportation according to claim 4, wherein a shaft for releasing the operation of said negatively operational electro-magnetic brake.

* * * * *